(No Model.)
W. D. BEATY.
CAR SIGNAL.
No. 295,144. Patented Mar. 18, 1884.
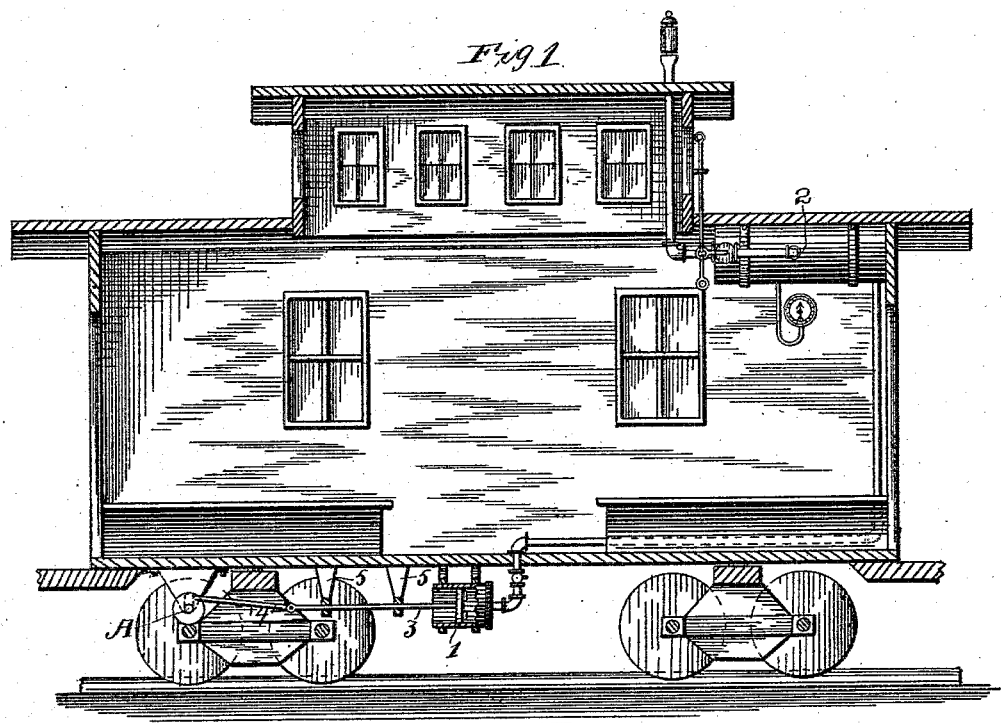
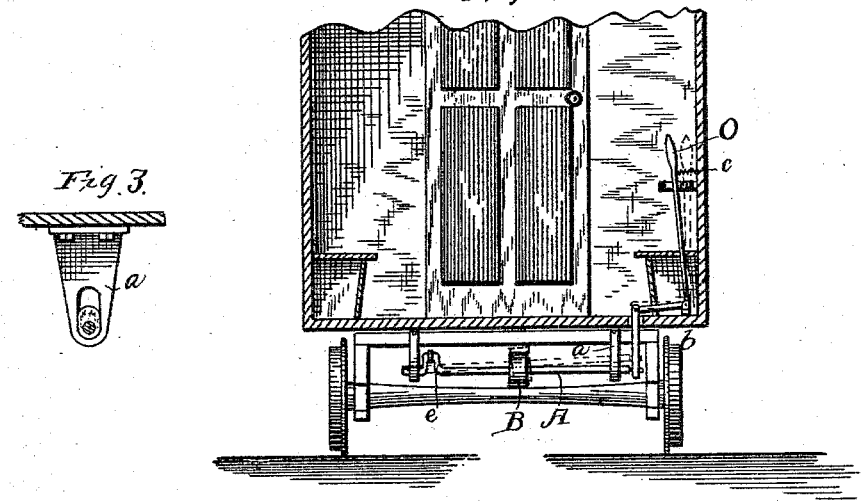
WITNESSES
W. E. Bowen.
Chas. R. Burr.
INVENTOR
William D. Beaty
per O. E. Duffy
Attorney

United States Patent Office.

WILLIAM D. BEATY, OF MANNINGTON, WEST VIRGINIA.

CAR-SIGNAL.

SPECIFICATION forming part of Letters Patent No. 295,144, dated March 18, 1884.

Application filed August 22, 1883. (No model.)

*To all whom it may concern:*

Be it known that I, WILLIAM DUDLEY BEATY, of Mannington, in the county of Marion and State of West Virginia, have invented certain new and useful Improvements in Indicator-Signals for Railway-Trains; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in signals for railway-trains, adapted particularly for use on the caboose of freight-trains to establish an easy communication between the conductor and engineer.

The signal to which my invention is adapted to be applied is one in which air is forced into a reservoir by an air-pump, the connection between the piston-rod of which and the axle of the car is brought into contact with such axle in such a way that the circular motion of the axle is converted into a reciprocating motion of the piston-rod. In devices of this kind a whistle is connected, by means of a pipe having a valve, to the air-vessel, which whistle is sounded by opening the valve in the pipe and allowing the air which is held under pressure in the reservoir to pass up the pipe and into such whistle.

My invention consists of a novel means of communicating the motion of the axle to the piston of an air-pump.

In the accompanying drawings, Figure 1 is a side view of a caboose with the signal apparatus and my improved connection attached, and with one side of the car broken away. Fig. 2 is a rear view of the same. Fig. 3 is a detail of the hanger which supports the end of the shaft to which the lever is attached.

In these drawings, 1 represents the air-pump, which has a piston provided with valves, said valves being opened when the piston is drawn back, thus admitting the air, and closed when the piston is pushed forward, thus forcing the air on the piston into the reservoir, where it is held by a co-operating valve. The piston-rod is made in two pieces, 3 and 4. The rod proper is carried by hangers 5, and the connecting-piece 4 is connected to the crank in the shaft A. 2 is a reservoir having a pipe-connection between itself and the air-pump. The reservoir is provided with an indicator, by which is shown the pressure of the air therein. To one end of this reservoir is connected a pipe having at its end a whistle. At the point of connection between the reservoir and pipe is a valve, which, when open, allows the compressed air from the reservoir to escape and sound the whistle.

A represents a crank-shaft mounted in hangers on the under side of the caboose. On this shaft is mounted and fixed a friction-wheel, B, made of rubber, felt, prepared paper, or like material, which will produce great frictional contact. The circumference of the wheel B should be much greater than that of the axle with which it comes in contact, so that the speed with which the piston-rod rotates is moderate, and thus is obviated unusual wear on the piston and cylinder.

$a$ is a hanger, (shown more clearly in Fig. 3,) which is adapted to hold one end of the shaft A in such a way that the shaft may be raised, and consequently the friction-wheel lifted out of contact. The shaft is held down and lifted by means of a lever, O, and its connection. This lever O is pivoted in a bracket fixed to the floor of the caboose. It is rightangular in shape. Its longer and upwardly-projecting portion is capable of being sprung aside slightly, and has on its inner edge a sharp-faced projection, which is adapted to fit into the serrated plate $c$, fixed to the side of the car, and thus the shaft is held in any desired position. To the shorter horizontal arm of the lever is pivoted a piece, $b$, which in turn is pivoted to one end of the shaft A near the hanger $a$. In the shaft A is a crank, $e$, at which point is attached the piston-rod of the air-pump.

From the description foregoing it will be evident that a forward movement of the lever will force the shaft A down, and thus bring the friction-wheel in contact with the axle, and also that a backward movement will bring the shaft up and the wheel out of contact, so that the contact may be kept up until the reservoir is judged to be full enough, and then the pumping stopped.

Having described my invention, what I claim is—

1. In a car-signal, and in combination with the alarm thereof, the shaft A, secured beneath the car, provided with friction-wheel B, adapted to bear on the axle, and having a crank-turn, to which is secured the piston-rod of an air-pump, 1, which forces air into a reservoir, where it is held under pressure for subsequent use, the lever O, pivoted within the car, and connected to the end of the shaft A by the link $b$, and held in any desired position by the serrated plate $c$, substantially as described.

2. In a car-signal, and in combination with the alarm thereof, the shaft A, secured beneath the car, provided with friction-wheel B, adapted to bear on the axle, and having a crank-turn, to which is secured the jointed piston-rod of an air-pump having valved piston-head, said air-pump being secured to the bottom of a car, and adapted to force air through connecting-pipes into a reservoir, 2, and means for raising, lowering, and holding in place the shaft A, consisting of the lever O, pivoted inside the car, and connected to the end of the shaft A by link $b$ and plate $c$, for holding the lever in any desired position, substantially as described.

3. In a car-signal, the combination of the shaft A, secured beneath the car by the hangers $a\ a'$, the latter of which is slotted, as described, having the crank-turn, to which is secured the jointed piston-rod supported by the hangers 5, the air-pump 1, secured beneath the car, reservoir 2, whistle, connecting-pipes, and the lever O, pivoted within the car, and connected to the shaft A by link $b$, and held in place by serrated plate $c$, all substantially as described.

In testimony that I claim the foregoing as my own I affix my signature in presence of two witnesses.

WILLIAM D. BEATY.

Witnesses:
O. E. DUFFY,
DAVID H. MEAD.